UNITED STATES PATENT OFFICE.

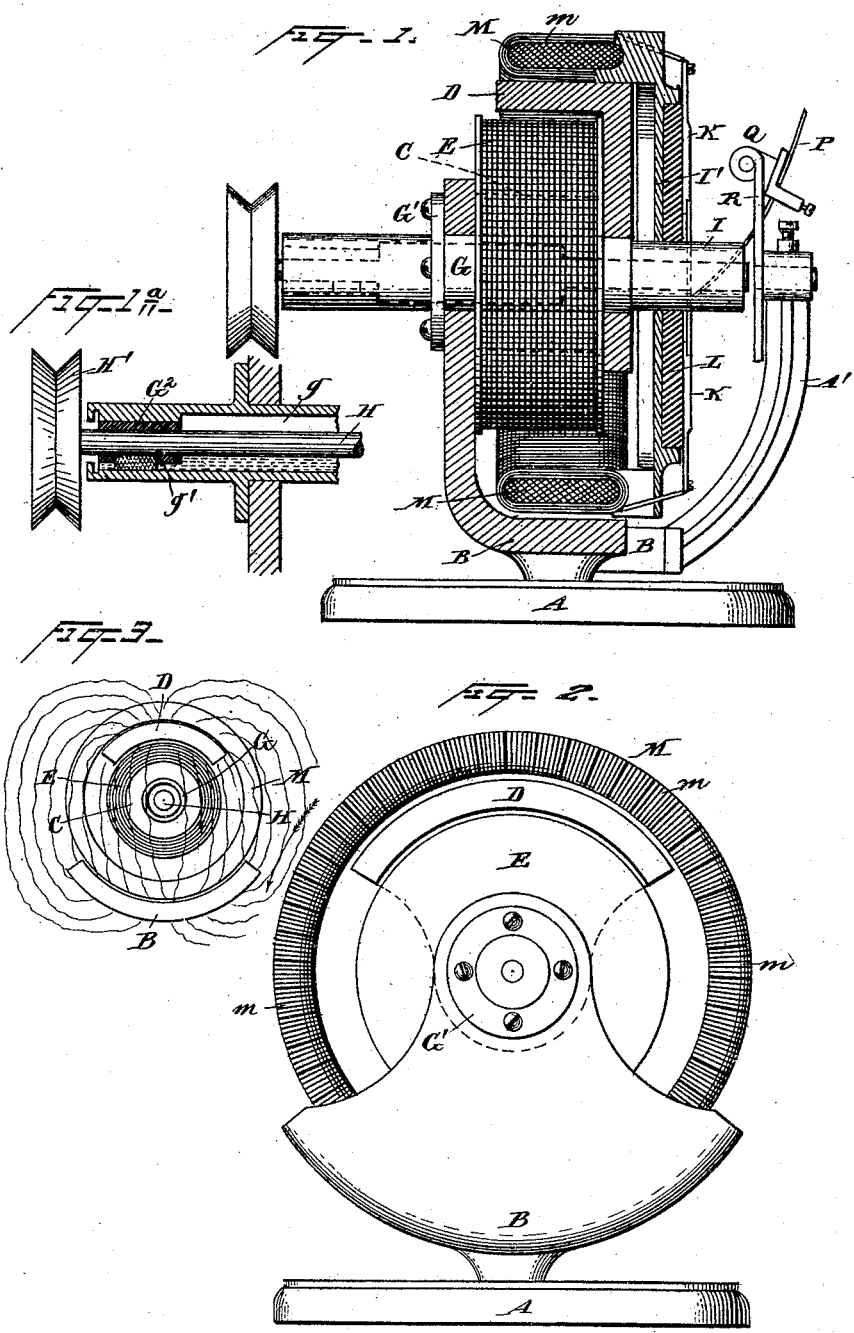

FRANKLIN H. BEERS, OF NEWARK, ASSIGNOR TO HIMSELF, AND WILLIAM M. TALLMAN, OF PLAINFIELD, NEW JERSEY, AND ERASTUS HAYES AND AL. R. BRANDLY, OF NEW YORK, N. Y.

ELECTRIC MOTOR.

SPECIFICATION forming part of Letters Patent No. 487,242, dated December 6, 1892.

Application filed February 26, 1892. Serial No. 422,874. (No model.)

*To all whom it may concern:*

Be it known that I, FRANKLIN H. BEERS, a citizen of the United States, residing at Newark, in the county of Essex, in the State of New Jersey, have invented a certain new and useful Improvement in Electric Motors, of which the following is a specification.

The improved motor is adapted to serve in any position and to perform a great variety of work, the revolutions being, as in other motors of this class, rapid and requiring for most purposes to be connected by belting or otherwise, so as to reduce the speed and increase the force of the revolutions. I will show the motor as revolving on a horizontal axis running in bearings supported on a broad base or foot. I arrange the field-magnets and poles so that one pole is on the outside of the revolving armature and the opposite pole or set of poles is on the inside of the same. I place the inner one on the opposite side of the axis from the outer. The effect is to carry the lines of force through the armature to require only two brushes and to hold the field-magnet at the distance apart for the greatest useful effect.

My improved motor is unusually efficient. It is simple in construction and my experiments indicate that it gives a more than usually high velocity of rotation with a given amount of current and load.

The accompanying drawings form a part of this specification and represent what I consider the best means for carrying out the invention.

Figure 1 is a central vertical section, partly in elevation, and Fig. 2 is an end view of the same with the pulley removed. Fig. 3 is a diagram showing the magnetic lines or "lines of force" with the single pair of poles shown in Figs. 1 and 2.

Similar letters of reference indicate corresponding parts in all the figures where they appear.

A is the base or foot, which may be of wood. B is an external pole set firmly in the foot A and extending up to the mid-height. D is the internal pole having its effective portion in the top and reaching down a little below the center. These parts B and D are connected by a stout cylindrical core C, which is preferably cast in one with the external pole B.

E is a cylindrical field-magnet of ordinary construction fixed on the core C and electrically connected in the ordinary manner to a dynamo or other source of electricity to carry a strong continuous current.

G is a stout sleeve fitted in a corresponding hole bored or otherwise produced through the core C and extending through the poles B and D. It is secured by bolts inserted through the flange G'.

H is the shaft or arbor of the motor, fitted centrally in the axial line of the sleeve G and carrying on one end a hub I, on which is fixed a spider I' and a set of commutators K, the latter being separated from the spider by vulcanized fiber or other efficient insulating material L. The opposite end of the shaft H extends beyond the sleeve G and carries a pulley H', which by a belt (not shown) communicates the rapid motion to any mechanism which the motor is required to impel. The spider I' carries hooks, (not shown,) which embrace a circular revolving armature M, made up in sections properly wound and insulated and fitted to run close to, but out of contact with, the external pole B, and also to run close to, but out of contact with, the internal pole D. The wires forming the several sections of the revolving armature are extended, as indicated by $m$, and form electrical connections with the corresponding plates or segments of the commutators K.

P is one of a pair of brushes, which may be of the ordinary construction, each mounted in a holder Q and connected by a spring (not shown) to an insulating-yoke R, supported on an arm A', bolted upon the side of the external pole B, as shown. Electrical connection is made in the ordinary way from the terminal of the field-magnet E to the positive brush and from the negative brush to the dynamo. (Not shown.)

The sleeve G provides at each end a long bearing for the rapidly-revolving arbor H. The mid-length of the sleeve is chambered larger, as shown at $g$ in Fig. 1ª. The bearing adjacent to the pulley H' is formed by an interior sleeve G², which may be of brass, secured by a pinching screw. (Not shown.)

I provide for supplying oil in liberal quantities at longer or shorter intervals to the capacious chamber $g$ in the interior of the sleeve G. When the oil is nearly exhausted, it is led up to the bearing by a wick inserted in a channel $g'$. (Shown in Fig. 1ª.)

As with other motors, the current which excites the field-magnets may be independent of that which excites the armature or the wires connected in series, as described. My machine, like others, may by a slight alteration in the brushes, or even without any alteration be worked as a dynamo to produce electrical currents by the expenditure of mechanical power instead of being worked, as described, to produce mechanical power from electrical currents.

It is common in considering machines of this class to conceive an infinite number of lines extending more or less directly from one pole to the other, which lines are cut by the revolving armature, and the effect is dependent on the number and strength of the lines thus cut. Some of the lines are straight, taking the shortest course from one pole to the other, while others describe a large part of a circle; but all terminate in the poles. My invention causes the armature to cut a greater proportion of such lines than any of the ordinary constructions. This is illustrated in the diagram Fig. 3.

The long bearing for the arbor at each end of the sleeve G has a channel $g'$ and contains a wick for conducting oil from the base of the central chamber $g$.

I claim as my invention—

In an electric motor having a revolving armature, one field-magnet pole arranged exteriorly to such armature and one field-magnet pole mounted interiorly to such armature, the said field-magnet poles being arranged on opposite sides of the axis of motion, substantially as herein specified.

In testimony that I claim the invention above set forth I affix my signature in presence of two witnesses.

FRANKLIN H. BEERS.

Witnesses:
CHARLES R. SEARLE,
JOSE L. FINGLETON.